US00RE33979E

United States Patent [19]

Cortopassi

[11] E Patent Number: Re. 33,979

[45] Reissued Date of Patent: Jun. 30, 1992

[54] CONTENT-IDENTIFYING CARTON STRUCTURE

[75] Inventor: Jeffery J. Cortopassi, Miami, Fla.

[73] Assignee: Taco Bell, Corp., Irvine, Calif.

[21] Appl. No.: 389,341

[22] Filed: Aug. 3, 1989 (Under 37 CFR 1.47)

Related U.S. Patent Documents

Reissue of:

[64] Patent No.: 4,684,023
Issued: Aug. 4, 1987
Appl. No.: 878,316
Filed: Jun. 25, 1986

[51] Int. Cl.[5] ..... B65D 5/22

[52] U.S. Cl. ..... 206/459; 229/8; 229/153; 229/902

[58] Field of Search ..... 206/459; 229/8, 153, 229/902, 919; 40/312

[56] References Cited

U.S. PATENT DOCUMENTS

| | | | |
|---|---|---|---|
| 959,261 | 5/1910 | Reber | 229/153 |
| 1,695,143 | 12/1928 | Drapeau | 229/919 |
| 3,071,882 | 1/1963 | Eisman et al. | 40/312 |
| 3,109,252 | 11/1963 | Schellenberg | 229/8 |
| 3,205,603 | 9/1965 | Brumley | 40/312 |
| 3,346,164 | 10/1967 | Zeitter | 229/16 R |
| 3,958,744 | 5/1976 | Herglotz | 229/6 R |
| 3,999,660 | 12/1976 | Tranquillitsky | 206/434 |
| 4,004,691 | 1/1977 | Wihksne | 206/459 |
| 4,265,393 | 5/1981 | Orchard | 229/902 |
| 4,413,730 | 11/1983 | Morse | 206/459 |
| 4,472,896 | 9/1984 | Brauner et al. | 206/459 |
| 4,548,352 | 10/1985 | Capo et al. | 229/17 G |

FOREIGN PATENT DOCUMENTS 950273 2/1964 United Kingdom .

*Primary Examiner*—Gary E. Elkins
*Attorney, Agent, or Firm*—Scully, Scott, Murphy & Presser

[57] ABSTRACT

A multi-purpose carton and, more particularly, a folding paperboard carton incorporating content-identifying structure enabling identification of the carton contents without necessitating the opening of the carton. Moreover, also disclosed is a paperboard blank for forming the carton.

8 Claims, 3 Drawing Sheets

CONTENT-IDENTIFYING CARTON STRUCTURE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a multi-purpose carton and, more particularly, relates to a folding paperboard carton incorporating content-identifying structure enabling identification of the carton contents without necessitating the opening of the carbon. Moreover, the invention also relates to a paperboard blank for forming the carton.

Numerous restaurant operations which are presently engaged in the so-called high-volume fast-food or "take-out order" retail trade, employ packaging techniques in which a extensive variety of differently seasoned and prepared types of food items are packaged in similar or identically configured packages, such as the well-known and widely employed foldable paperboard carton structures. In view of the large variety of food items, and the diversity in condiments, seasonings and preparation of some of these food items which are packaged in virtually identical cartons, it is frequently difficult to precisely identify the nature of the packaged food item without necessitating opening of the carton by either the salesperson or the purchaser in order to view and identify the contents thereof. This procedure by its very nature, is not only time-consuming and cumbersome, but is also unhygienic in necessitating exposing the contents of the carton.

In order to be able to furnish the restaurant employees, such as the employees packing the carton contents and the sales personnel, as well as the ultimate consumer, with readily ascertainable information over the contents of a closed product-containing carton, without the necessity of having to open the previously closed or sealed carton, the present invention contemplates the provision of a multi-purpose carton of the herein described type, in which the carton incorporates selectively displayable legends or indicia as an integral component thereof, which will enable a viewer to immediately obtain information over the carton contents.

2. Discussion of the Prior Art

In essence, foldable paperboard cartons which have product or content-identifying legends or indicia provided thereon are currently known in the technology and, in at least one instance, are specifically adapted for utilization in the packaging into cartons of food items which are widely merchandised in "fast food" or "take-out orders" retaurant retailing operations.

Brumley, U.S. Pat. No. 3,205,603 discloses a content identification carton which is constructed from a foldable paperboard blank and which has content-identifying legends imprinted on the outwardly facing surfaces of at least one of the carton panels or flaps. Overlying carton panels incorporate tear-tab elements arranged in registry with the underlying printed legends and, in turn, are imprinted with corresponding content-identifying legends. In order to provide information to a purchaser over the contents in the closed carton, the retail personnel need merely tear off the appropriate tear-tab element identifying the carton contents, so as to the expose to view the identifying legend imprinted on a contrastingly colored background on the carton panel or flap located therebelow. Although this type of structure allows for visual information over the carton contents without necessitating opening of the carton, the need for having to tear off carton segments represented by the tear-tab elements poses the risk that any inadvertent tearing off of an incorrect tear-tab element will impart erroneous information over the carton contents which cannot be readily remedied.

Herglotz, U.S. Pat. No. 3,958,744 discloses a paperboard carton structure wherein coupons may be stripped from various carton surface areas by removing layers of the carton defined by cuts extending into the carton material through a portion of the thickness thereof.

Morse, U.S. Pat. No. 4,413,730 relates to a cardboard carton structure including a windowed extension. A slide card is movably supported within the extension, and includes imprinted legends adapted to be selectively viewed through the windowed carton extension in order to provide information to a viewer with regard to the carton contents.

Although the above-mentioned publications relate to various state-of-the-art aspects in providing information over the carton contents to a consumer, without the need for having to open the carton and visually inspecting the contents thereof, the manner of imparting this information to the carton structure is cumbersome and time-consuming and, at times, may even lead to the inadvertent destruction of the carton integrity and undesireable exposure of its contents.

SUMMARY OF THE INVENTION

In order to alleviate or obviate the limitations encountered in the prior art with regard to cartons of the type described which include content-identifying legends or structure, the present invention contemplates the provision of a carton, preferably constructed from of a unitary paperboard blank which is adapted to be folded and erected into a closeable carton, wherein a content-identifying arrangement, in a simple and expedient manner, consists of legends imprinted on a surface of a carton panel or flap which is hingedly joined to one of the carton panels and which is insertable in surface contact behind another carton panel containing a plurality of tuck-tabs. The tuck-tabs are adapted to be selectively depressed inwardly of the so as to bend back and upon release engage rearwardly of the flap containing the printed legends so as to expose to external view an associated content-identifying legend or indicia in registry with the depressed tuck-tab to thereby provide content information to a viewer, such as a salesperson or consumer. This will eliminate the need for removing or tearing off portions of the carton, such as tear-tabs, and through simple manipulation, facilitate obtaining visual information over the carton contents without the necessity of opening the carton or adversely affecting the integrity of the carton structure.

The expedient of arranging the printing of the product-identifying legends on an underlying flap, and if desired, correlatingly on the tuck-tabs allows for an easily effected and readily viewable identification of the nature of the product or food item packaged in the carton and concurrently imparts a generally clean and uncluttered, pleasingly aesthetic appearance to the carton exterior without any requirement for stickers, grease pencil markings, or removal of carton segments for identifying the carton contents.

Accordingly, it is a primary object of the present invention to provide a carton of the foldable paperboard type, which incorporates content-identifying structure supplying information to a consumer without the need for opening the carton and inspecting the contents thereof.

A more specific object of the present invention resides in the provision of a carton of the type described herein which includes a plurality of tuck-tabs adapted to be selectively depressed so as to depend behind a carton flap imprinted with content-identifying providing identifying legends or graphics pertaining to the particular contents of the carton, so as to expose to view predetermined legends or indicia representative of the carton contents.

Still another object of the present invention is to provide a carton structure of the type described in which the flap containing the carton content-identifying legends is a component of a carton closure arrangement, and wherein the depression of selective of the tuck-tabs will not, in any manner, adversely affect the integrity of the closed carton structure.

Yet another object of the present invention is to provide a paperboard blank of unitary construction for constructing of the inventive carton.

DETAILED DESCRIPTION

Figure 1:
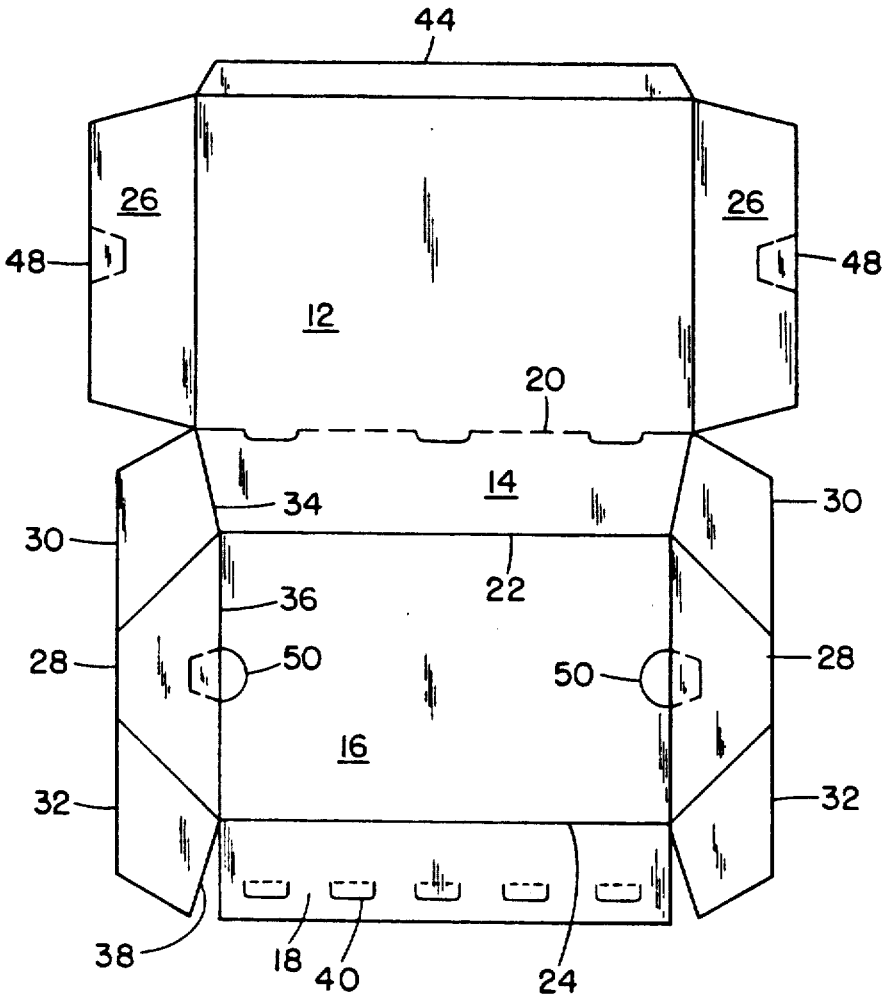
FIG. 1 illustrates a paperboard blank utilized in the formation of a first embodiment of the novel content-identifying carton construction.

Referring now in detail to the drawings, and particularly FIG. 1, a carton blank element 10 for forming a carton essentially comprises a one-piece, die-cut flat paperboard structure which may have a glossy, decorative surface of suitable colors, with advertising and product-identifying indicia and graphics impringed and/or embossed thereon for a decorative aesthetically pleasing carton appearance, as is well known in the carton art. The carton blank element 10 essentially consists of panels 12, 14, 16 and 18 which are hinged together along suitable fold lines 20, 22 and 24 constituted from score lines in the paperboard material and extending in mutual parallel relationship with each other. Herein, panel 12 may constitute the top or front wall of the carton, panel 16 the bottom or rear wall, and panels 14 and 18 may each be considered carton end walls. Extending from each side of panel 12 is a side panel 26; creasable side panels 28 extend from the appropriate ends of panel 16 and incorporate foldable end portions 30 and 32 joined to, respectively, panels 16 and 18 along crease lines 34, 36 and 38.

Formed in the panel 18 are a plurality of tuck-tabs 40 which are arranged in series in proximity to and in parallel with the free edge thereof, and which tuck-tabs are generally of rectangular U-shaped configurations having three sides thereof cut through the thickness of panel 18 and a fourth side 42 joining the legs of the U-shape adapted to be depressed into the carton out the plane of panel 18.

The edge of panel 12 opposite hinge line 20 has a flap 44 integrally joined thereto so as to be foldable along hinge line 46 upon closing of the carton, and thereby constituting a closure flap when tucked inwardly of panel 18 in the erected carton condition.

Figure 2:
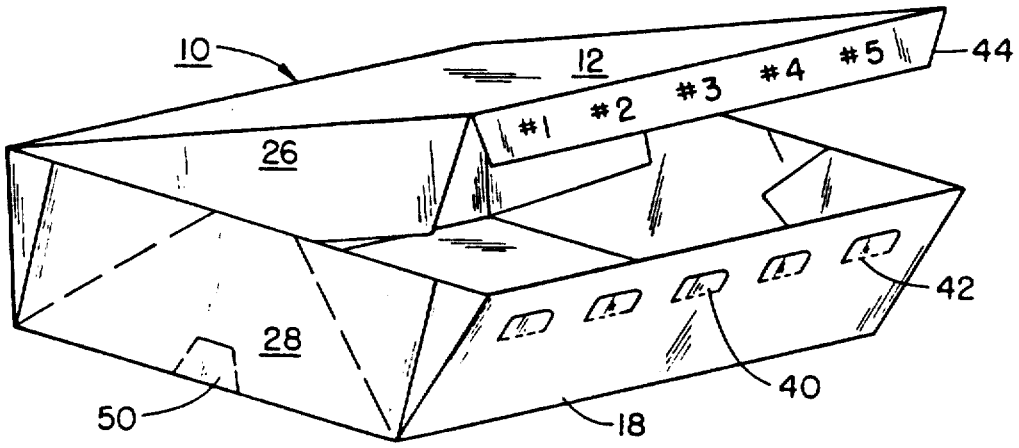
FIG. 2 illustrates a perspective view of a content-identifying carton, shown in a partly opened condition, erected from the blank of FIG. 1.
Figure 3:
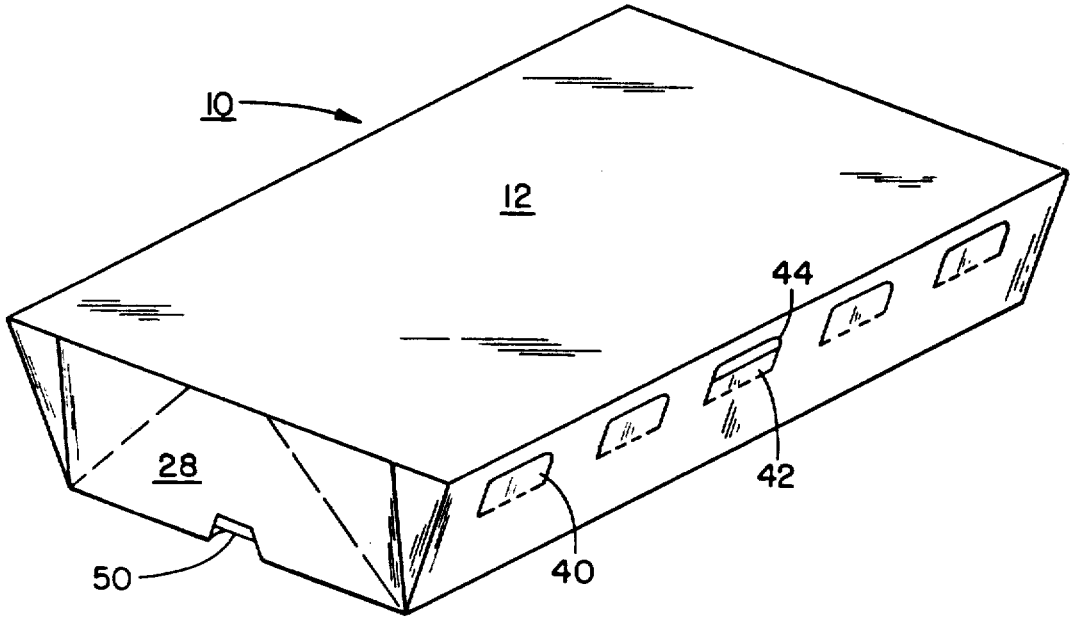
FIG. 3 illustrates a front and side perspective view of the carton of FIG. 2 in its fully closed position and showing one of the tuck-tabs in a content-identifying position.

As shown in the erected carton of FIGS. 2 and 3, which is constructed from the blank element 20, the flap end portions 30 and 32 are separated from each of the panels 28, and the end panel 28 is superimposed thereon and adhesively fastened thereto, as is illustrated in FIG. 2 of the drawings.

In order to form a closed carton structure by means of the top or front panel 12, the side panels 26 are inserted between the panels 28, and suitable notched panel portions 48 are engaged by cut-outs 50 provided at the juncture between panels 16 and 28, so as to form a latching arrangement causing the front or top panel 12 to remain in a carton-locking condition. Concurrently, the flap 44 is inserted into the carton behind the panel 18 so as to be in registry and surface contacting engagement with the inner surface panel 18 directly rearwardly of the tuck-tabs 40.

The provision of suitable product or content-identifying legends or indicia on the surface of the flap 44 facing towards and in registry with the positions of the tuck-tabs 40 on panel 18 will enable identification to be made of a food item or carton content by simply exerting pressure on an appropriately labeled tuck-tab 40 (or tabs), causing it to deflect inwardly along its hinge edge 42, which is generally in line with the free edge of flap 44, and to engage behind the flap 44, thereby exposing to view the imprinted legend on the flap which is in registry with the particular tuck-tab. The exposed surface of the flap 44 may be of a contrasting color to enable a salesperson or consumer to readily identify the product contained in the carton without necessitating the opening of the carton.

Figure 4:
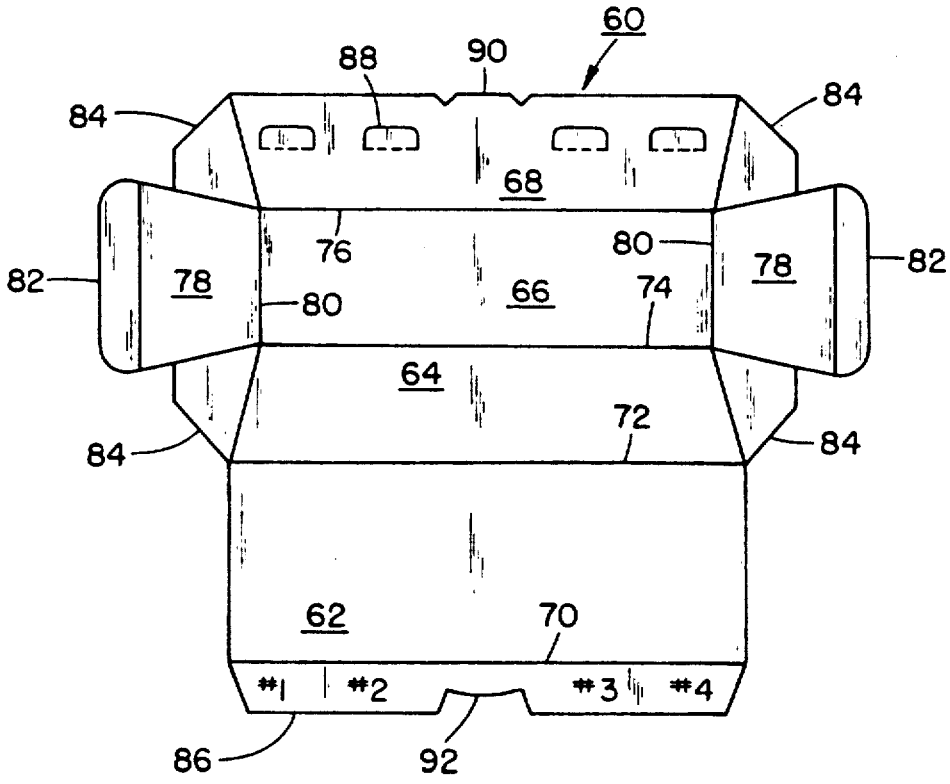
FIG. 4 illustrates a paperboard blank for a second carton embodiment.
Figure 5:
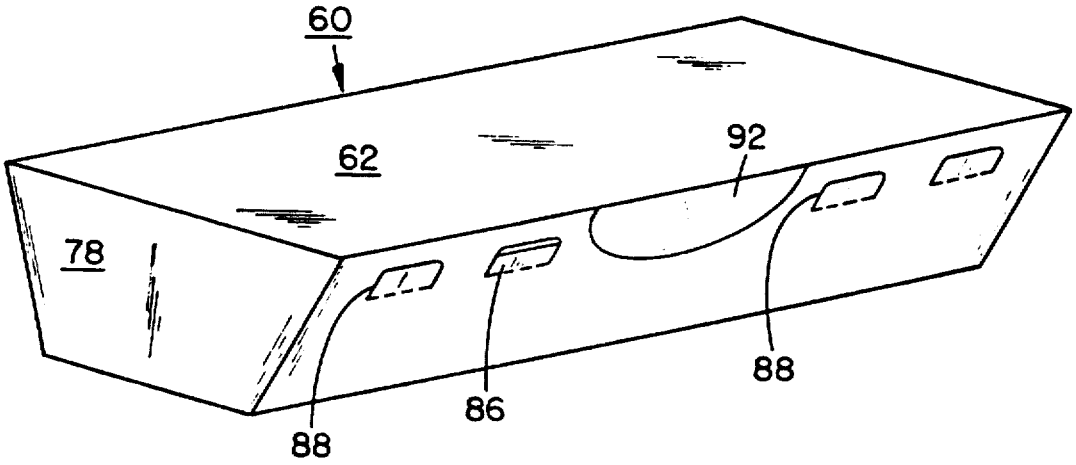
FIG. 5 illustrates a front and side perspective view of a erected and closed carton constructed from the blank of FIG. 4.

The paperboard blank and carton structure illustrated in FIGS. 4 and 5 is similar to the carton construction described with regard to FIGS. 1 to 3, but is primarily directed to the formation of a smaller sized carton.

Referring particularly to FIG. 4, a paperboard blank 60, which is similar to blank 10 may be provided with an external decorated and imprinted and/or embossed surface includes panels 62, 64, 66 and 68. The panels are foldable relative to each other by means of a plurality of parallel hinge lines 70, 72, 74 and 76.

The panel 62 may constitute the top or front panel of the carton construction, similar to the structure described with respect to the previously described carton embodiment. The side walls of the carton may be formed by panels 78 at the ends of panel 66, both end panels 78 being foldable relative thereto along hinge lines 80, and in turn may be provided with inwardly foldable flaps 82. The panels 64 and 68 are provided at each end thereof with foldable flaps 84.

At the hinge line 70 the panel 62 extends into a flap 86 having a surface thereof imprinted with appropriate legends or content-identifying indicia or graphics in registry with tuck-tabs 88 on the panel 68, which are of a configuration and arrangement similar to the tuck-tabs 40 described in the preceding embodiment.

The central portion of the outer edge of panel 68 is provided with suitable cooperating latching elements 90 and 92, as is well known in carton closure technology.

Upon the erection of the blank 60 into a carton, as shown in FIG. 5 of the drawings, the panels 62 through 68 are folded inwardly, the end flaps 84 are tucked in and the end panels 78 superimposed with the flaps 82 being tucked beneath the top panel 62.

Upon closing of the carton, the flap 86 is tucked in surface contacting engagement beneath panel 68, so as to cause the imprinted legends thereon identifying the carton contents to be in registry with the respectively associated tuck-tabs 88. Upon selectively depressing one or more of the tuck-tabs 88 to engage rearwardly of flap 86, the imprinted product-identifying legend or legends will be exposed to view so as to provide information about the carton contents without the need for opening the carton contents, in a manner similar to that described with respect to the embodiment of FIGS. 1 to 3.

Figure 6:
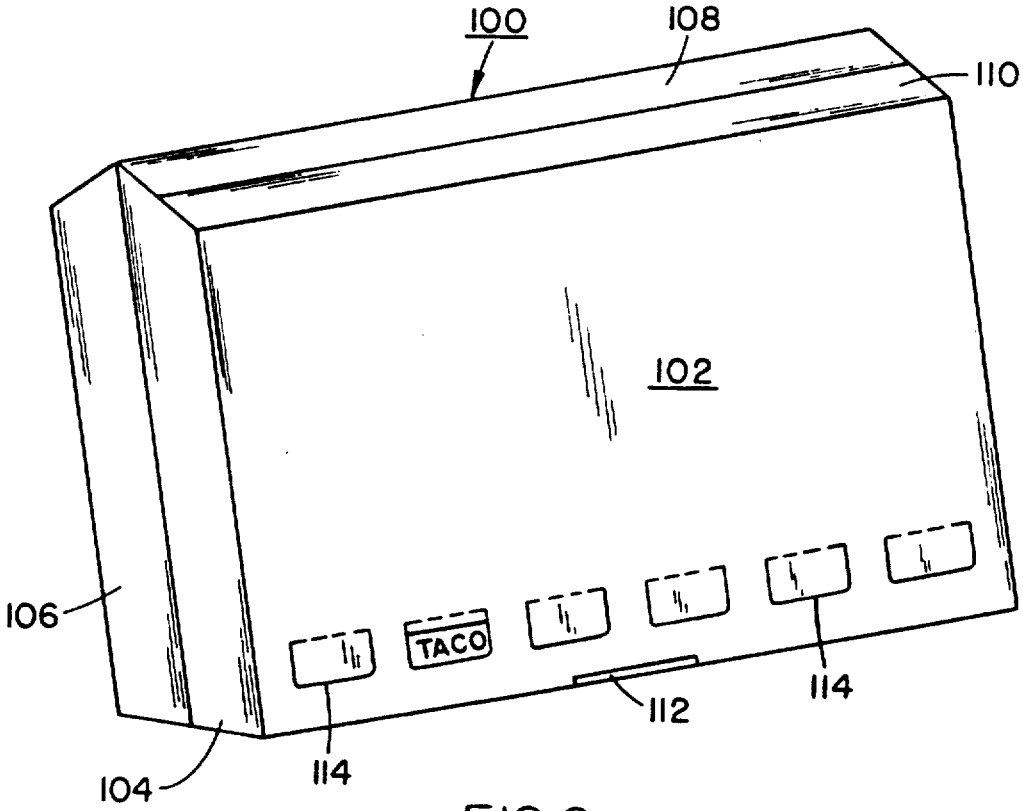
FIG. 6 illustrates a front and side perspective view of a third embodiment of a closed carton pursuant to of the invention.

The carton illustrated in FIG. 6 is similar to that of the foregoing embodiments but, in this instance, relates to a relatively flat pocket-shaped carton 100 which includes suitable panels constituting a front panel 102, overlapping side panels 104 and 106, top panels 108 which may be folded along a crease line 110, and suitable bottom and rear panels (not shown) wherein the bottom panel may be latched to the front panel 102 through a suitable latching arrangement 112 as is well known in the art.

The bottom panel may be provided with a suitable flap similar to the flap structures 44 or 86 of the preceding embodiments, which folds rearwardly in surface contacting engagement behind the front panel 102, and is in registry with a plurality of spaced tuck-tabs 114 formed in the front panel 102 proximate the lower edge thereof.

As in the preceding embodiments, in order to be able to identify the contents of the carton 100, without necessitating opening of the carton, it is merely necessary to depress selective of the tuck-tabs 14 so as to engage rearwardly of the flap containing imprinted legends in registry with cooperating tuck-tabs, and thereby affords visual information to a viewer concerning the carton contents.

From the foregoing, it is clearly apparent that the invention is directed at a novel and simple arrangement for identifying the contents of a carton, which is particularly adapted for so-called "fast-food" or "take-out orders" operations in the restaurant retail trade without necessitating opening of the carton or, in any manner, adversely affecting the integrity of the carton structure, through a simple manipulation of one or more tuck-tabs in registry with content-identifying information imprinted on a carton flap structure.

While there has been shown and described what are considered to be preferred embodiments of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. A multi-purpose carton incorporating a content-identifying arrangement, said carton comprising integral front panel, rear panel, end panel and side panel structures hingedly joined along a plurality of fold lines to provide a foldable [, parallelepiped] carton configuration, a flap hingedly joined to an outer edge of only one of said panels, and adapted to underlie a second of said panels in surface contact therewith and being pivotal away from said second panel, about said outer edge, in the erected condition of said carton and forming a carton closure, said flap having carton content-identifying legends imprinted on the surface facing said second panel; a plurality of tuck-tabs in a [linearly] spaced array cut into said second panel [so as to be] , *with each tuck-tab being* joined thereto along a [single] hinge line and being arranged to overlie [said flap coextensive with] said flap, said underlying flap terminating *underneath each of said tuck-tabs* substantially [in alignment with] *parallel to* the hinge line [of said tuck-tabs] *joining the tuck-tab to the second panel*, each of said tuck-tabs being selectively depressable to engage rearwardly of said flap in [coextensive] surface contact therewith to provide visual access to printing on said flap in registry with the location of said depressed tuck-tab indicative of the contents in said carton without the necessity of opening said carton.

2. A carton as claimed in claim 1, wherein said one panel is the end panel, the second panel is the front panel, said end panel is hinged to the rear panel, said plurality of tuck-tabs are cut into the front panel of said carton proximate to a free edge of said front panel, said flap being integrally joined with the end panel and depending within said front panel inwardly of said carton in the erected condition of said carton.

3. A carton as claimed in claim 1, wherein said one panel is the front panel, said second panel is the end panel, said plurality of tuck-tabs are cut into the end panel of said carton which is hingedly connected with said rear panel, said front panel having said flap integrally joined therewith and depending behind said end panel inwardly of said carton in the erected condition of said carton.

4. A carton as claimed in claim 1, wherein said plurality of tuck-tabs are spaced in series along said second panel proximate a front edge of said carton to afford ready viewing thereof from the front of said carton for identifying the carton contents.

5. A carton as claimed in claim 1, wherein each of said tuck-tabs comprises a substantially rectangularly U-shaped tab having three sides thereof cut through said second panel so as to be manually deflectable into said carton for latching engagement rearwardly of said flap.

6. A carton as claimed in claim 5, wherein said front and rear panels of said carton include cooperating latching structures for forming a reopenable carton closure.

7. A carton as claimed in claim 6, wherein the edge of said tuck-tabs, which remains connected to said second panel includes a score line to facilitate deflecting said tuck-tab means into said carton.

8. A paperboard blank of unitary construction for forming the carton of claim 1.

* * * * *